United States Patent
Marrisette, Sr.

(10) Patent No.: US 10,421,358 B1
(45) Date of Patent: Sep. 24, 2019

(54) SMART PHONE WITH INTEGRATED BREATHALYZER

(71) Applicant: Douglas Marrisette, Sr., Jackson, AL (US)

(72) Inventor: Douglas Marrisette, Sr., Jackson, AL (US)

( * ) Notice: Subject to any disclaimer, the term of this patent is extended or adjusted under 35 U.S.C. 154(b) by 114 days.

(21) Appl. No.: 15/156,414

(22) Filed: May 17, 2016

(51) Int. Cl.
  *B60K 28/02* (2006.01)
  *H04W 4/14* (2009.01)
  *H04W 4/80* (2018.01)

(52) U.S. Cl.
  CPC ............ *B60K 28/02* (2013.01); *H04W 4/14* (2013.01); *H04W 4/80* (2018.02)

(58) Field of Classification Search
  CPC ............................................. B60K 28/02
  See application file for complete search history.

(56) References Cited

U.S. PATENT DOCUMENTS

| | | | | |
|---|---|---|---|---|
| 8,560,010 B2 * | 10/2013 | Koehn | ............... | B60K 28/063 422/83 |
| D696,213 S | 12/2013 | Nawaz | | |
| 9,272,713 B1 * | 3/2016 | Dvoskin | ............... | B60W 40/08 |
| 2003/0183437 A1 * | 10/2003 | Mendoza | ........... | G01N 33/4972 180/272 |
| 2004/0081582 A1 * | 4/2004 | Brooke | ............... | G01N 33/497 422/62 |
| 2005/0053523 A1 * | 3/2005 | Brooke | ............. | G01N 33/4972 422/68.1 |
| 2006/0058697 A1 | 3/2006 | Mochizuki | | |
| 2008/0227466 A1 * | 9/2008 | Rabanne | ............... | G01S 5/0027 455/456.1 |
| 2009/0215466 A1 | 8/2009 | Ahl | | |
| 2010/0009626 A1 | 1/2010 | Farlety | | |
| 2011/0077032 A1 | 3/2011 | Correale | | |
| 2012/0242469 A1 * | 9/2012 | Morgan | ................ | B60K 28/06 340/426.11 |
| 2016/0050309 A1 * | 2/2016 | Gooberman | ...... | H04M 1/72577 455/418 |

FOREIGN PATENT DOCUMENTS

WO  2016062618 A2  5/2013

* cited by examiner

*Primary Examiner* — Nicole T Verley

(57) ABSTRACT

The smart phone with integrated breathalyzer is a transportation safety device. The smart phone with integrated breathalyzer is further adapted for use with a personal data device. The smart phone with integrated breathalyzer comprises a vehicle module and a modified personal data device. The modified personal data device is a personal data device that further comprises an integral breathalyzer and an application. The modified personal data and the vehicle module exchange information using Bluetooth connection. The information exchanged comprises information regarding the condition of the driver and the enablement or disablement of the SMS functionality of the modified personal data device.

8 Claims, 5 Drawing Sheets

SMART PHONE WITH INTEGRATED BREATHALYZER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and transportation safety devices, more specifically, a safety device responsive to conditions related to the driver.

SUMMARY OF INVENTION

The smart phone with integrated breathalyzer is a transportation safety device that is adapted for use with vehicles. The smart phone with integrated breathalyzer comprises a vehicle module and a modified personal data device. The modified personal data device is a personal data device that further comprises an integral breathalyzer and an application. The modified personal data device uses the Bluetooth capability of the personal data device to communicate with the vehicle module. The communication between the vehicle module and the modified personal data device comprises: 1) communication from the modified personal data device to the vehicle module that the user has a blood alcohol concentration below the impaired driving limit; 2) communication from the vehicle module to the modified personal data device that the engine of the vehicle is operating; and, 3) communication from the vehicle module to the modified personal data device that the engine of the vehicle is not operating. When the vehicle module receives the blood alcohol concentration message the vehicle module enables the ignition of the vehicle. When the modified personal data device receives the engine is operating message, the modified personal data device disables the SMS functionality of the modified personal data device. When the modified personal data device receives the engine is not operating message, the modified personal data device enables the SMS functionality of the modified personal data device.

These together with additional objects, features and advantages of the smart phone with integrated breathalyzer will be readily apparent to those of ordinary skill in the art upon reading the following detailed description of the presently preferred, but nonetheless illustrative, embodiments when taken in conjunction with the accompanying drawings.

In this respect, before explaining the current embodiments of the smart phone with integrated breathalyzer in detail, it is to be understood that the smart phone with integrated breathalyzer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the smart phone with integrated breathalyzer.

It is therefore important that the claims be regarded as including such equivalent construction insofar as they do not depart from the spirit and scope of the smart phone with integrated breathalyzer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
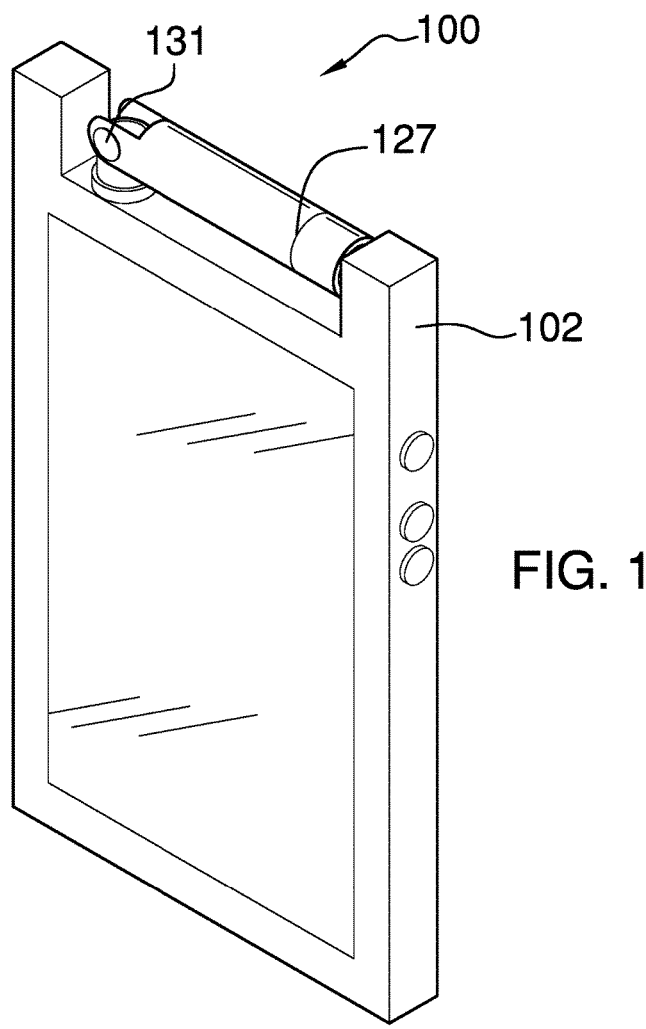
FIG. 1 is a perspective view of an embodiment of the disclosure.
Figure 2:
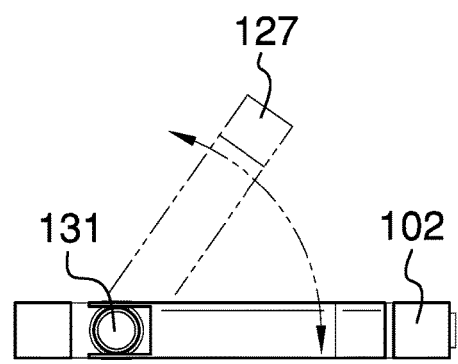
FIG. 2 is a top view of an embodiment of the disclosure.
Figure 3:
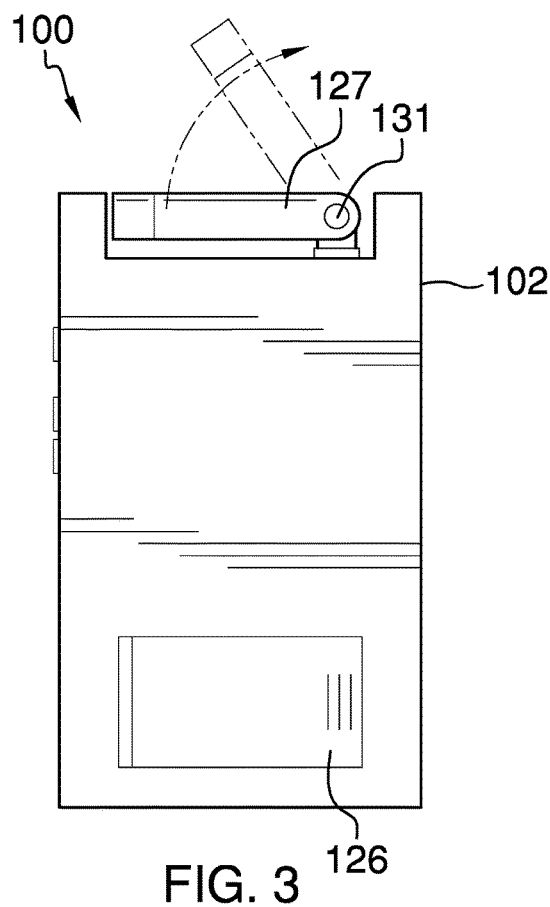
FIG. 3 is a back view of an embodiment of the disclosure.
Figure 4:
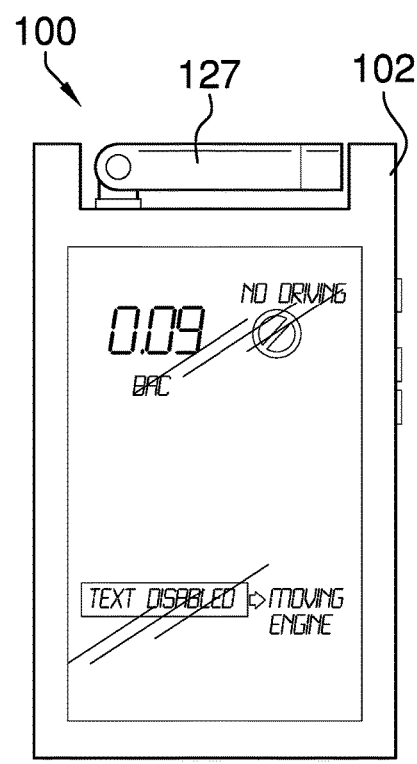
FIG. 4 is a front view of an embodiment of the disclosure.
Figure 5:
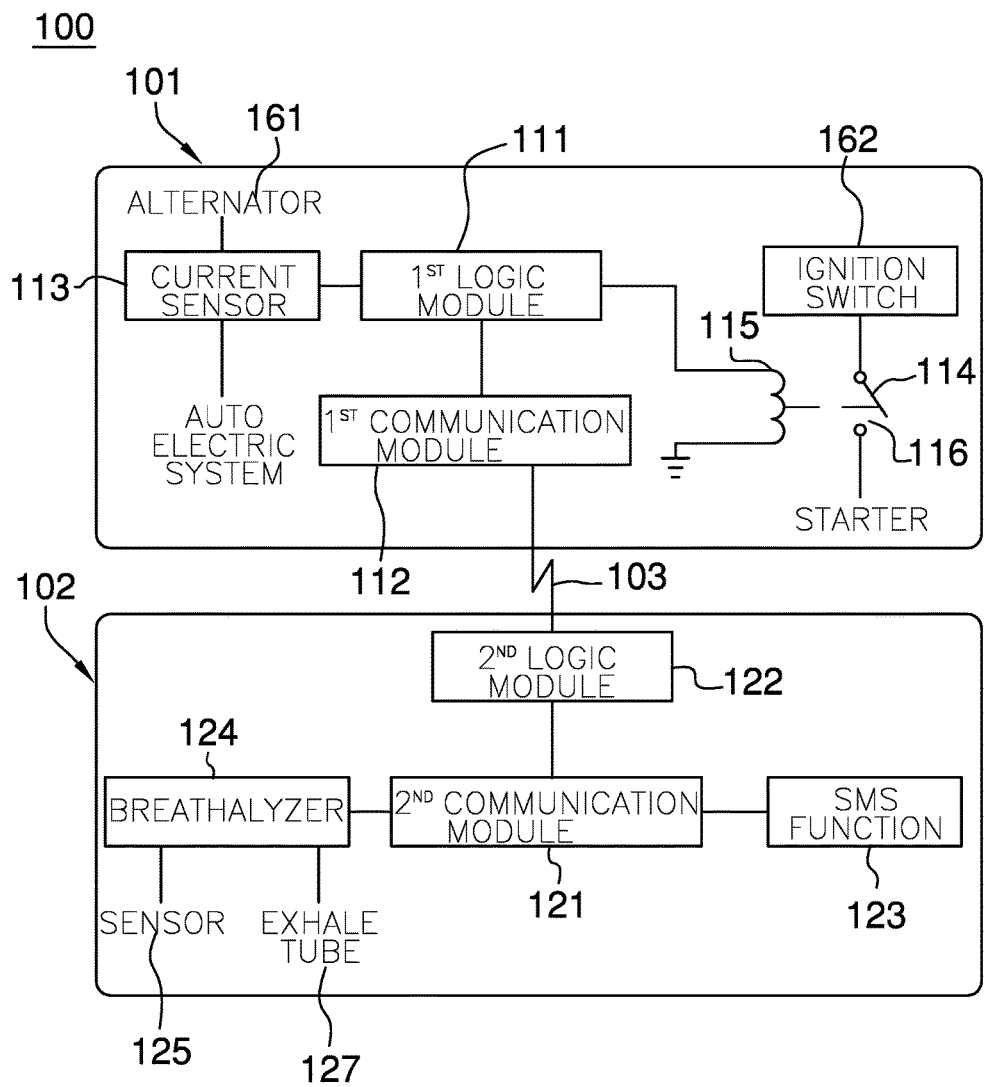
FIG. 5 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The smart phone with integrated breathalyzer 100 (hereinafter invention) comprises a vehicle module 101 and a modified personal data device 102. The invention 100 is a transportation safety device that is adapted for use with vehicles. The modified personal data device 102 is a personal data device that further comprises an integral breathalyzer 124 and an application 120. The modified personal data device 102 uses the Bluetooth capability of the personal data device to communicate 103 with the vehicle module 101. The communication 103 between the vehicle module 101 and the modified personal data device 102 comprises: 1) communication 103 of a first message 141 from the modified personal data device 102 to the vehicle module 101 that the user has a blood alcohol concentration below the impaired driving limit; 2) communication 103 of a second message 142 from the vehicle module 101 to the modified personal data device 102 that the engine of the vehicle is operating; and, 3) communication 103 of a third message 143 from the vehicle module 101 to the modified personal data device 102 that the engine of the vehicle is not operating. When the vehicle module 101 receives the first message 141 the vehicle module 101 enables the ignition of the vehicle. When the modified personal data device 102 receives the second message 142, the modified personal data device 102 disables the SMS functionality 123 of the modified personal data device 102. When the modified personal data device 102 receives the third message 143, the modified personal data device 102 enables the SMS functionality 123 of the modified personal data device 102.

The vehicle module 101 further comprises a first logic module 111, a first communication module 112, a current sensor 113, and an ignition relay 114. The first logic module 111 is a readily and commercially programmable electronic device that is used to control and operate the vehicle module 101. The first communication module 112 is a readily and commercially available Bluetooth compatible transceiver. The current sensor 113 is a sensor that is monitored by the logic module 111. The current sensor 113 is configured to sense the output current of the alternator 161. When the current sensor 113 senses an output current from the alternator 161 the logic module 111 will proceed under the assumption that the vehicle engine is running. The ignition relay 114 is a readily and commercially available relay. As shown most clearly in FIG. 5, the switch 115 of the ignition relay 114 is wired in series between the ignition switch 162 and the starter 163 of the vehicle. The operation of the coil 116 of the ignition relay 114 is controlled by the logic module 111.

The modified personal data device 102 comprises an application 120 and a breathalyzer 124 that are incorporated into a commercially available personal data device. The modified personal data device 102 is intended to be an integrated unit that is custom built for its purpose. While the modified personal data device 102 is intended as a single unit, the modified personal data device 102 will be described as being a modification to existing personal data devices that are commercially available. The modified personal data device 102 is described in this manner solely for the purposes of simplicity and clarity of exposition of the disclosure is not intended to limit the scope of the appended claims. Those skilled in the art will recognize that the modified personal data device 102 as described in this disclosure can be implemented in either manner and that the disclosure can be readily modified to accommodate the manufacture as an integrated unit with a minimum of modification and experimentation.

The application 120 is a programmed set of instructions that is loaded on to the personal data device to allow the personal data device to interface with the vehicle module 101. The personal data device selected to be modified further is further defined by a second logic module 121, a second communication module 122, and SMS functionality 123. It is believed by the applicant that majority of personal data devices currently on the market meet these requirements. The second logic module 121 is a programmable device that is used to execute the programmed set of instructions contained within the application 120. The second communication module 122 is a Bluetooth transceiver. SMS functionality 123 is a secondary communication mechanism that is commonly referred to as text messaging. Methods to develop and implement applications on personal data devices are well known and documented in the engineering and software arts.

The breathalyzer 124 is a device that measures the blood alcohol concentration of a patient. Breathalyzer 124 units are readily and commercially available and are well known and documented in the art. In a first potential embodiment of the disclosure, the breathalyzer 124 comprises an alcohol sensor 125, a power source 126, a mouthpiece 127, a resistor 128, and an output voltage 129. The alcohol sensor 125 is a commercially available alcohol gas sensor that generates an analog resistive output that varies in a known manner to the concentration (ppm) of alcohol in the gas sample. The power source 126 is used to: 1) drive a voltage divider that is used by the second logic module 121 to measure the analog resistive output; and, 2) to power a heater 130 contained within the alcohol sensor 125. The power source 126 associated with the personal data device used as the basis for the modified personal data device 102 is adequate for use as the power source 126. The mouthpiece 127 is a tube which transports exhaled air into contact with the alcohol sensor 125. The mouthpiece 127 is attached to the modified personal data device 102 with a pivot 131. The pivot allows the mouthpiece 127 to rotate such that the free end of the mouthpiece 127 will project away from the modified personal data device 102 while the invention 100 is in use.

Figure 7:
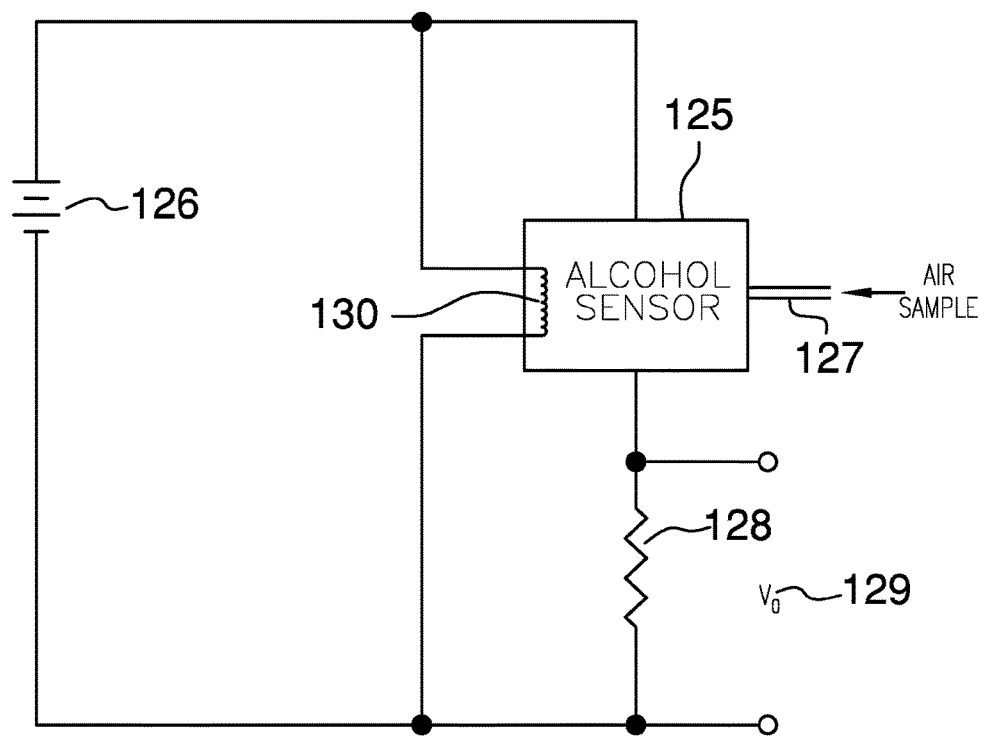
FIG. 7 is a schematic diagram of an embodiment of the disclosure.

As shown most clearly in FIG. 7, the sensor section of the alcohol sensor 125 is wired into a series circuit with the power source 126 and the resistor 128. The resistor 128 is a readily and commercially available resistor. The resistor 128 and alcohol sensor 125 form a voltage divider. A measurable output voltage 129 that varies in a known manner to variations in the analog resistive output of the alcohol sensor 125 can be measured as the output voltage 129 across the resistor 128. The second logic module 121 is used to measure the output voltage 129 across the resistor 128 which can be related using well known methods back to calculate the analog output resistance of the alcohol sensor 125 which can be related via the documentation provided with the sensor to the concentration (ppm) of alcohol in the gas sample. The concentration (ppm) of alcohol in the gas sample can be related to the BAC using publically available information (current conversion as of this writing is 1 ppm=1.06 microgram per mL). Methods to perform the measurements and calculations described in this paragraph using an application 120 and a personal data device are well known and documented in the electrical and software arts. Potential implementations are discussed elsewhere in this disclosure.

Figure 6:
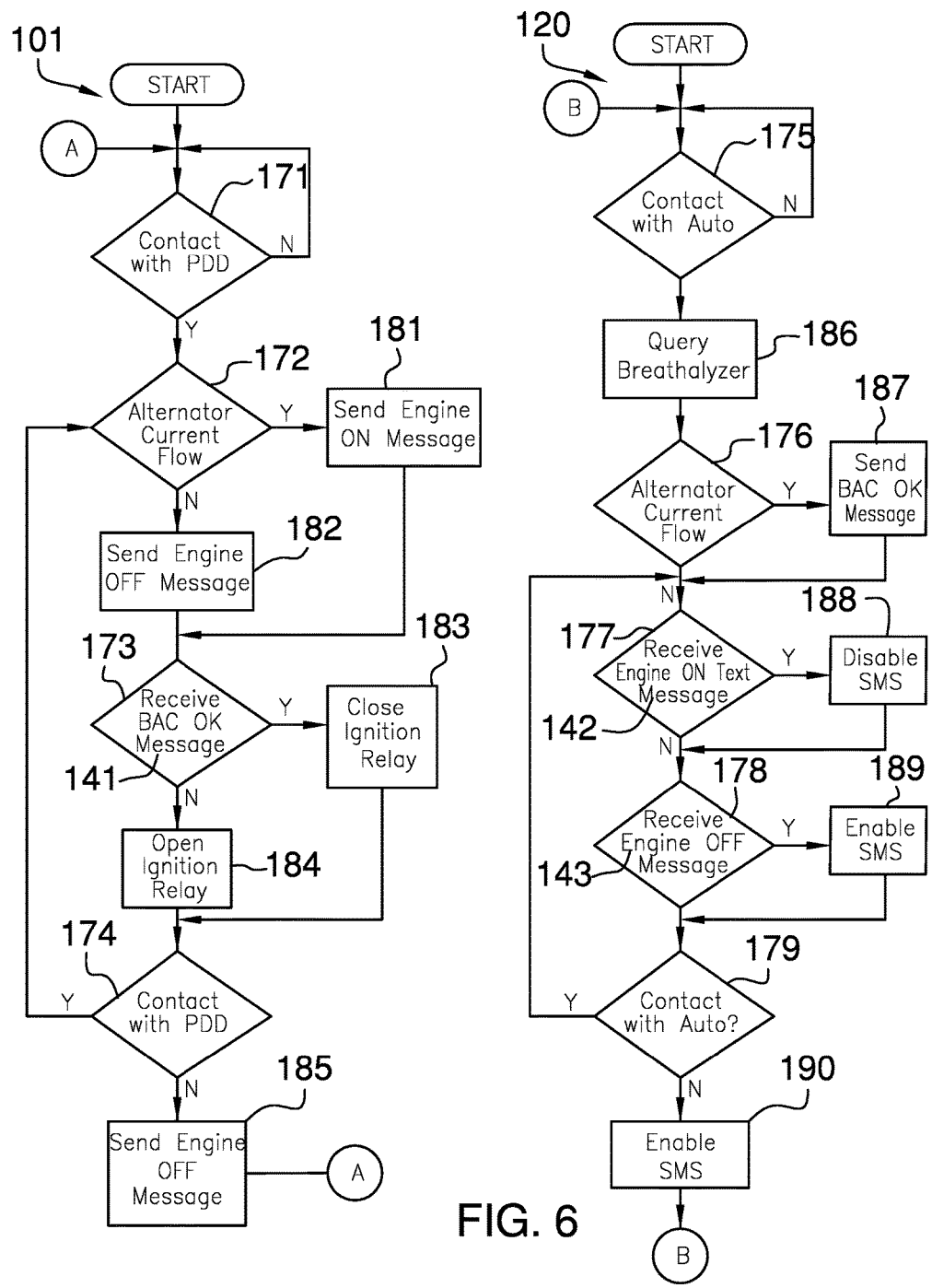
FIG. 6 is a flowchart of an embodiment of the disclosure.

As shown most clearly in FIG. 6, the operation of the first logic module 111 starts in a first decision 171 loop determining whether the vehicle module 101 is connected to the modified personal data device 102. If the vehicle module 101 is not connected to the modified personal data device 102, the first logic module 111 remains in the first decision 171 loop. If the first logic module 111 determines that the vehicle module 101 is connected to the modified personal data device 102, the first logic module 111 makes a second decision 172 by querying the current sensor 113. If the current sensor 113 is detects current flow from the alternator 161, the first logic module 111 takes a first action 181 by sending the second message 142 (indicating the engine is on) to the modified personal data device 102 via the first communication module 112 and the second communication module 122. If the current sensor 113 detects no current flow from the alternator 161, the first logic module takes a second action 182 by sending the third message 143 (indicating the engine is off) to the modified personal data device 102 via the first communication module 112 and the second communication module 122. The first logic module 111 then makes a third decision 173 indicating whether the first message 141 (BAC OK) has been received. If the first message 141 has been received, the first logic module 111 takes a third action 183 by closing the ignition relay 114. If the first message 141 has not been received, the first logic module takes a fourth action 184 of opening the ignition relay 114. The first logic module 111 then makes a fourth decision 174 indicating whether the modified personal data device 102 is still connected to the vehicle module 101. If the connection is broken, the first logic module takes a fifth action 185 by sending the third message 143 (indicating the engine is off) to the modified personal data device 102 via the first communication module 112 and the second communication module 122. The first logic module then returns to the first decision 171 loop. If the connection is still in place, the first logic module 111 loops back to the second decision 172.

As shown most clearly in FIG. 6, the operation of the modified personal data device 102 starts with a fifth decision 175 loop determining whether the modified personal data device 102 is connected to the vehicle module 101. If the modified personal data device 102 is not connected to the vehicle module 101, the first logic module 111 remains in the fifth decision 175 loop. If the modified personal data device 102 is connected to the vehicle module 101, the application 120 takes a sixth decision 176 by taking a sixth action 186 of querying the breathalyzer 124 and calculating the blood alcohol concentration. If the user has a blood alcohol concentration below the impaired driving limit, the application 120 takes a seventh action 187 of sending a first message 141 (BAC OK) to vehicle module 101 using the second communication module 122 and the first communication module 112. The application 120 then makes a seventh decision 177 to determine whether the modified personal data device 102 has received the second message 142 (indicating the engine is on). If the second message 142 has been received the application 120 takes an eighth action 188 of disabling the SMS functionality 123. The application 120 then makes an eighth decision 178 to determine whether the modified personal data device 102 has received the third message 143 (indicating the engine is off). If the modified personal data device 102 has received the third message 143, then the application 120 takes a ninth action 189 of enabling the SMS functionality 123. The application 120 then makes a ninth decision 179 to determine that the modified personal data device 102 is still connected to the vehicle module 101. If the connection is established, the application 120 loops back to the seventh decision 177. Otherwise, the application 120 takes a tenth action 190 of enabling the SMS functionality 123 and loops back to the fifth decision 175 loop.

To use the invention 100, the vehicle module 101 and the modified personal data device 102 are set up to establish communication 103 whenever they are in range for communication 103. In order to operate the vehicle, the user must exhale into the mouthpiece 127 and register a blood alcohol concentration below the impairment limit. Once communication 103 is established, the rest of the operation of the invention 100 is automatic.

Suitable first logic modules 111 include, but are not limited to, Arduino microcontrollers and their associated shields and housings. Bluetooth shields that are compatible with Arduino microcontrollers are readily and commercially available. Suitable current sensors include, but are not limited to, a readily and commercially available noninvasive split core current transformer such as the Sparkfun SEN-011005. Methods to integrate split core current transformers into Arduino microcontrollers are known and documented in the electrical arts. Methods to select and use relays in circuits are well known and documented in the electrical arts.

In the first potential embodiment of the disclosure, suitable alcohol gas sensors include, but are not limited to, a commercially available gas sensor such as the Sparkfun SEN-08880 MQ3 Gas Sensor. The remaining components of the breathalyzer 124 are readily and commercially available. The information and methods required to assemble and operate the breathalyzer 124 as described in this disclosure are well known and documented in the electrical and software arts. In an alternate embodiment of the disclosure, a commercially available breathalyzer with USB connectivity can be used.

The following definitions were used in this disclosure:

Application or App: As used in this disclosure, an application or app is a self-contained piece of software that is especially designed or downloaded for use with a personal data device.

BAC: As used in this disclosure, BAC is an acronym of blood alcohol concentration.

Blood Alcohol Concentration: As used in this definition, blood alcohol concentration is the mass of ethanol in a given volume of blood expressed as a percentage (mass/volume). While the intention of this definition is to express a measure of ethanol levels within the blood stream, it is understood that current measurement technologies are imperfect and may capture and include concentrations of other chemicals including, but not limited to, ketones, aldehydes, carboxylic acids, and other alcohols in the actual measurement of the blood alcohol concentration.

Bluetooth: As used in this disclosure, Bluetooth is a standardized communication protocol that is used to wirelessly interconnect electronic devices.

Logic Module: As used in this disclosure, a logic module is an electrical device that is programmable and that accepts digital and analog inputs, processes the digital and analog inputs according to previously stored instruction and to provide the results of these instructions as digital or analog outputs.

Personal Data Device: As used in this disclosure, a personal data device is a handheld device that is used for managing personal information and communication. Examples of personal data device include, but are not limited to, cellular phones, tablets and smart phones.

Pivot: As used in this disclosure, a pivot is a rod or shaft around which an object rotates or swings.

Relay: As used in this disclosure, a relay is an automatic electromagnetic or electromechanical device that reacts to changes in voltage or current by opening or closing a switch in an electric circuit. Note: Though transistors can be configured to perform switching functions, transistors used for switching functions are handled separately in this disclosure and are explicitly excluded from this definition.

Sensor: As used in this disclosure, a sensor is a device that receives and responds in a predetermined way to a signal or stimulus.

SMS: As used in this disclosure, SMS is an abbreviation for short message service. The short message service is a service that often provided with the cellular services that support personal data devices. Specifically, the SMS allows for the exchange of written messages between personal data devices. The SMS is commonly referred to as text messaging.

Transceiver: As used in this disclosure, a transceiver is a device that is used to transmit and receive radio signals.

Tube: As used in this disclosure, a tube is a hollow cylindrical device that is used for transporting liquids and gasses.

Vehicle: As used in this disclosure, a vehicle is a motorized device that is used transporting carrying passengers, goods, or equipment.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A transportation safety device comprising
a vehicle module and a modified personal data device;
wherein the transportation safety device is adapted for use with a vehicle;
wherein the vehicle is further defined with an alternator, an ignition switch, and a starter;
wherein the vehicle module interfaces and communicates with the personal data device;
wherein communication between the vehicle module and the modified personal data device comprises a first message, a second message, and third message;
wherein the first message causes the vehicle module to disable a connection between the ignition switch and the starter;
wherein the second message causes the modified personal data device to disable the SMS functionality;
wherein the third message causes the modified personal data device to enable the SMS functionality;
wherein the vehicle module further comprises a first logic module, a first communication module, a current sensor, and an ignition relay;
wherein the first communication module, the current sensor; and the ignition relay are connected to the first logic module;
wherein the first logic module is a programmable electronic device;
wherein the output of the current sensor is monitored by the logic module;
wherein the current sensor is configured to sense the output current of the alternator;
wherein the ignition relay further comprises a first coil and a first switch;
wherein the first switch is wired in series between the ignition switch and the starter;
wherein the operation of the coil is controlled by the logic module;
wherein the modified personal data device comprises an application and a breathalyzer;
wherein the modified personal data device is further defined by a second logic module, a second communication module, and SMS functionality;
wherein the application is a programmed set of instructions that are executed by the second logic module;
wherein the second logic module is a programmable device;
wherein the breathalyzer is a device that measures blood alcohol concentration;
wherein the breathalyzer comprises an alcohol sensor, a power source, a mouthpiece, a resistor, and an output voltage;
wherein the power source and the resistor are connected to the alcohol sensor;
wherein the mouthpiece routes gases to the alcohol sensor;
wherein the output voltage is measured across a circuit element selected from the group consisting of the resistor or the alcohol sensor.

2. The transportation safety device according to claim 1 wherein the alcohol sensor is an alcohol gas sensor;
wherein the alcohol sensor further comprises a heater.

3. The transportation safety device according to claim 2 wherein the alcohol sensor and the resistor are connected to form a voltage divider.

4. The transportation safety device according to claim 3 wherein the first communication module uses Bluetooth protocols;
wherein the second communication module uses Bluetooth protocols.

5. The transportation safety device according to claim 4 wherein the mouthpiece is attached to the modified personal data device with a pivot.

6. The transportation safety device according to claim 1 wherein the operation of the first logic module initiates with a first decision loop determining whether the vehicle module is connected to the modified personal data device;
wherein the first logic module makes a second decision determining if current is flowing from the alternator;
wherein the first logic module queries the current sensor;
wherein if the current sensor detects current flow from the alternator, the first logic module takes a first action by sending the second message to the modified personal data device via the first communication module and the second communication module;
wherein if the current sensor detects no current flow from the alternator, the first logic module takes a second action by sending the third message to the modified personal data device via the first communication module and the second communication module;
wherein the first logic module makes a third decision determining whether the first message has been received;
wherein if the first message has been received, the first logic module takes a third action by closing the ignition relay;
wherein if the first message has not been received, the first logic module takes a fourth action of opening the ignition relay;
wherein the first logic module makes a fourth decision determining whether the modified personal data device is connected to the vehicle module;
wherein if the connection between the vehicle module and the modified data device is broken the first logic module takes a fifth action by sending the third message to the modified personal data device via the first communication module and the second communication module.

7. The transportation safety device according to claim 6 wherein the output of the current sensor is connected to the logic module.

8. The transportation safety device according to claim 1 wherein the operation of the application initiates with a fifth decision loop determining whether the modified personal data device is connected to the vehicle module;

wherein if modified personal data device is connected to the vehicle module the application queries the breathalyzer;

wherein the application a sixth decision by calculating the blood alcohol concentration and determining whether the blood alcohol concentration is below the impaired driving limit;

wherein if the blood alcohol concentration is below the impaired driving limit, the application takes a seventh action of sending the first message to vehicle module using the second communication module and the first communication module;

wherein the application makes a seventh decision determining whether the modified personal data device has received the second message;

wherein if the second message has been received the application takes an eighth action of disabling the SMS functionality;

wherein the application makes a an eighth decision determining whether the modified personal data device has received the third message;

wherein the third message has been received then the application takes a ninth action of enabling the SMS functionality;

wherein the application makes a ninth decision to determine that the modified personal data device is still connected to the vehicle module and if the connection is disconnected the application takes a tenth action of enabling the SMS functionality.

\* \* \* \* \*